United States Patent [19]

Schorr

[11] Patent Number: 4,607,140
[45] Date of Patent: Aug. 19, 1986

[54] BUILD OUT CAPACITOR CIRCUIT

[75] Inventor: Ian A. Schorr, Chicago, Ill.

[73] Assignee: Rockwell International Corp., El Segundo, Calif.

[21] Appl. No.: 586,532

[22] Filed: Mar. 5, 1984

[51] Int. Cl.[4] .............................................. H04B 1/76
[52] U.S. Cl. ................................. 179/16 F; 333/214; 307/490; 179/170 D
[58] Field of Search ....... 179/170 NC, 170 G, 170 D, 179/170 R, 16 F, 16 AA; 178/45, 69 B, 69 C, 69 E, 69 F; 333/213, 214, 32; 328/128; 307/490, 494

[56] References Cited

U.S. PATENT DOCUMENTS

| | | | |
|---|---|---|---|
| 3,042,759 | 7/1962 | Bonner | 179/170 G |
| 3,582,563 | 6/1971 | Cragg | 179/16 F |
| 3,814,867 | 6/1974 | Boucher | 179/170 G |
| 3,919,502 | 11/1975 | Daryanani | 179/170 D |
| 4,100,515 | 7/1978 | Gupta | 330/80 R |
| 4,176,255 | 11/1979 | Rudisill, Jr. | 179/16 F |
| 4,357,494 | 11/1982 | Chambers, Jr. | 179/16 F |
| 4,368,361 | 1/1983 | Chung et al. | 179/170.2 |

Primary Examiner—Gene Z. Rubinson
Assistant Examiner—R. Vaas
Attorney, Agent, or Firm—C. B. Patti; V. Lawrence Sewell; H. Fredrick Hamann

[57] ABSTRACT

This disclosure depicts a build out capacitor for use with a voice frequency loaded pair having tip and ring terminals. The circuit comprises means for providing a virtual impedance between the tip terminal and ground and between the ring terminal and ground. The means has a first input connected to the tip terminal and a second input connected to the ring terminal. The means for providing also has first and second outputs. A first fixed capacitor is connected between the first output and the tip terminal and a second fixed capacitor connected between the second output and the ring terminal. The first capacitor is equal in value to the second capacitor.

6 Claims, 2 Drawing Figures

BUILD OUT CAPACITOR CIRCUIT

BACKGROUND OF THE INVENTION

This invention relates in general to capacitor build-out circuits (BOC) and in particular, to a circuit for producing a variable capacitance from a fixed capacitor utilized in an active network.

The electrical loss of cables increases with higher frequency and with longer distance. Along with these higher losses is associated the increasing difficulty of hearing and being heard while conversing with a second party on the line. Therefore, at some distance from the central office, the cable pairs must be treated with other devices in order that voice recognition and naturalness of speech is not lost. Inductive loading is one approach to reducing these cable losses.

An infinite number of different loading schemes are possible by using different values of inductance, different intervals between load points, and different cables.

Loading systems which have become standardized are designated by a letter which signifies the nominal distance between adjacent loading coils and a number which identifies the amount of inductance, in millihenrys, per loading coil. The three most prevalent spacing intervals are 3000, 4500, and 6000 feet used with a 44, 66 and 88 millihenry coil and designated B, D and H respectively.

The secondary parameters of cable pairs are substantially improved by loading. As a result, loading is used extensively in non-toll office-to-office trunks, toll connecting trunks and subscriber loops. The changes in secondary parameters due to loading are:

1. The attenuation is reduced within a certain pass band region. Beyond this region the attenuation becomes infinite. The frequency at which the attenuation approaches infinity is defined as the cutoff frequency.

2. The impedance within the pass band region is higher than that for the same pair without loading. It increases gradually with increasing frequency and as the cutoff frequency is approached it increases rapidly.

3. The velocity of propagation is substantially reduced.

4. In the voice frequency range, the impedance of loaded cable pairs are higher and more uniform then those of non-loaded pairs.

In a two wire voice frequency repeater a precise impedance must be realized to balance the line impedance in the Wheatstone bridge type circuit called the telephone hybrid. The balance network could be relatively simple if the two wire part is terminated with the H-88 loaded line having the near end section equal to 6,000 feet or D-66 loaded line having a 4500 feet end section. In practical situations the H-88 end section could vary from 0 to 6,000 feet (0 to 4500 feet for D-66). In such an application, the capacitive build out circuit (BOC) provides an adjustable shunt capacitance so that the effective end section length of the loaded pair may be built out to the nominal section length.

The addition of a capacitance build-out circuit must not disturb the longitudinal balance of the line, i.e., the impedance between tip and ground must be the same as the impedance between ring and ground. Standard practice is to implement build out capacitors using a large number of capacitors in binary progression and switching them in and out in various combinations to achieve the desired value. For N capacitor switch combinations, $2^N$ build out capacitor values could be implemented. Such a method of implementing build out capacitance is expensive, bulky and space consuming. It also is not practical for logic control or other forms of electronic control.

The present invention provides a novel solution to this problem not found in the prior art.

SUMMARY OF THE INVENTION

The present invention involves a build out capacitor for use with a voice frequency transmission line having tip and ring terminals. The circuit comprises means for providing a virtual impedance between the tip terminal and ground and between the ring terminal and ground. The means has a first input connected to the tip terminal and a second input connected to the ring terminal. The means for providing virtual impedance also has first and second outputs. A first fixed capacitor is connected between the first output and the tip terminal and a second fixed capacitor is connected between the second output and the ring terminal. In the preferred embodiment, the first capacitor is equal in value to the second capacitor.

OBJECTS OF THE INVENTION

It is a primary object of the present invention to provide an improved solid state build out capacitor circuit.

It is a secondary object to provide a build out capacitor circuit which is compact and economical to manufacture.

It is yet another object to provide a build out capacitor circuit which provides a variable virtual capacitance utilizing a fixed capacitance and a variable resistance.

It is still another object to provide a build-out capacitor circuit which provides a variable virtual capacitance without affecting the longitudinal balance of the line.

BRIEF DESCRIPTION OF THE DRAWINGS

The features of the present invention which are believed to be novel are set forth with particularity in the appended claims. The invention, together with further objects and advantages, may best be understood by reference to the following description taken in conjunction with the accompanying drawings, in the several figures of which like reference numerals identify like elements, and in which:

DESCRIPTION OF THE PREFERRED EMBODIMENT

The present invention provides a much needed alternative to the use of a plurality of capacitors to build-out a loaded voice frequency transmission line. A novel active circuit with a fixed capacitance produces the correct variable capacitance necessary for termination of the line.

In general terms the present invention is a build out capacitor circuit for use with a voice frequency loaded pair having tip and ring terminals. The circuit comprises a means for providing a virtual impedance between the tip terminal and ground and between the ring terminal and ground so that the two virtual impedances are equal. The means has a first input connected to the tip terminal and a second input connected to the ring terminal. The means also has first and second outputs. A first fixed capacitor is connected between the first output and the tip terminal and a fixed second capacitor is connected between the second output and the ring terminal. The second fixed capacitor is equal to the first fixed capacitor.

Figure 1:
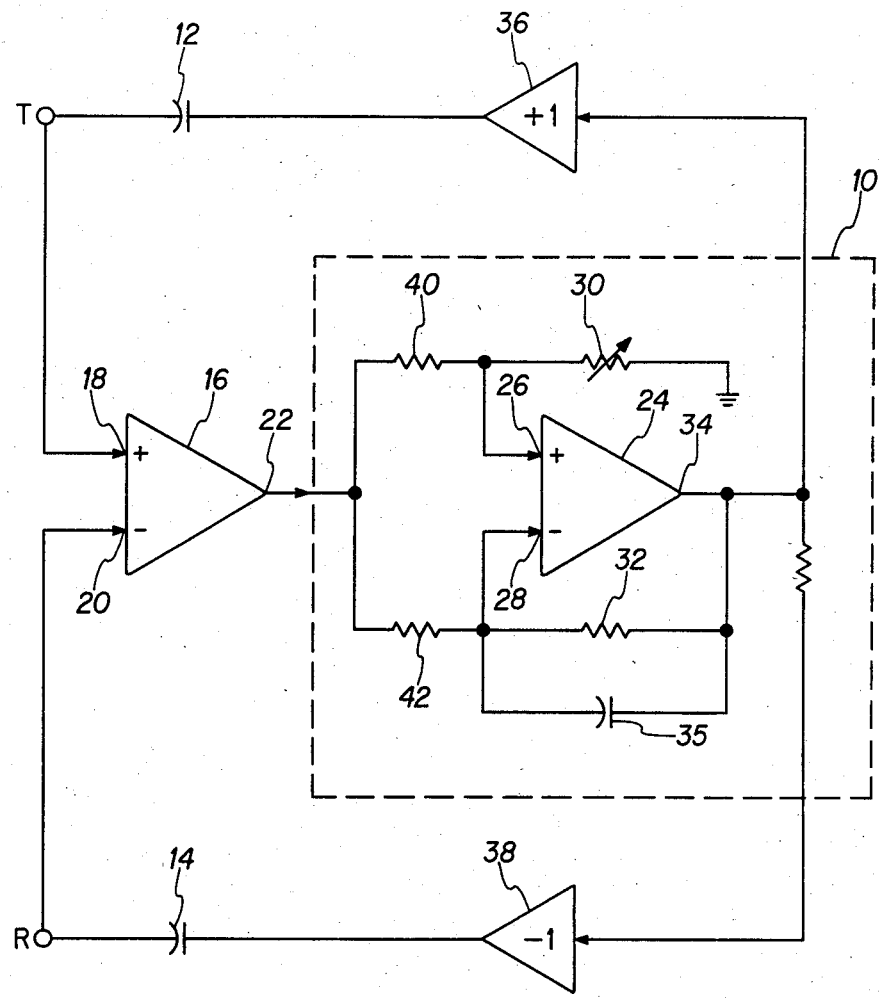
FIG. 1 is a block diagram of the present invention.

As shown in FIG. 1, the means for proving a virtual impedance comprises a means 10 for amplifying having a gain of K. The virtual impedance is equal to 1/SC (1−K), wherein C is the value of the first capacitor 12 or the second capacitor 14. The equivalent capacitance, $C_{eq}$, is equal to C(1−k). When K equals one, the $C_{eq}$ will be equal to zero. K equal to zero results in $C_{eq}$ equal to C; and with a negative K, $C_{eq}$ will be greater than C creating a capacitor multiplier. The gain of the means for amplifying is adjustable from +1 to −(G−1) thereby providing an virtual capacitance adjustable from O to GC.

Figure 2:
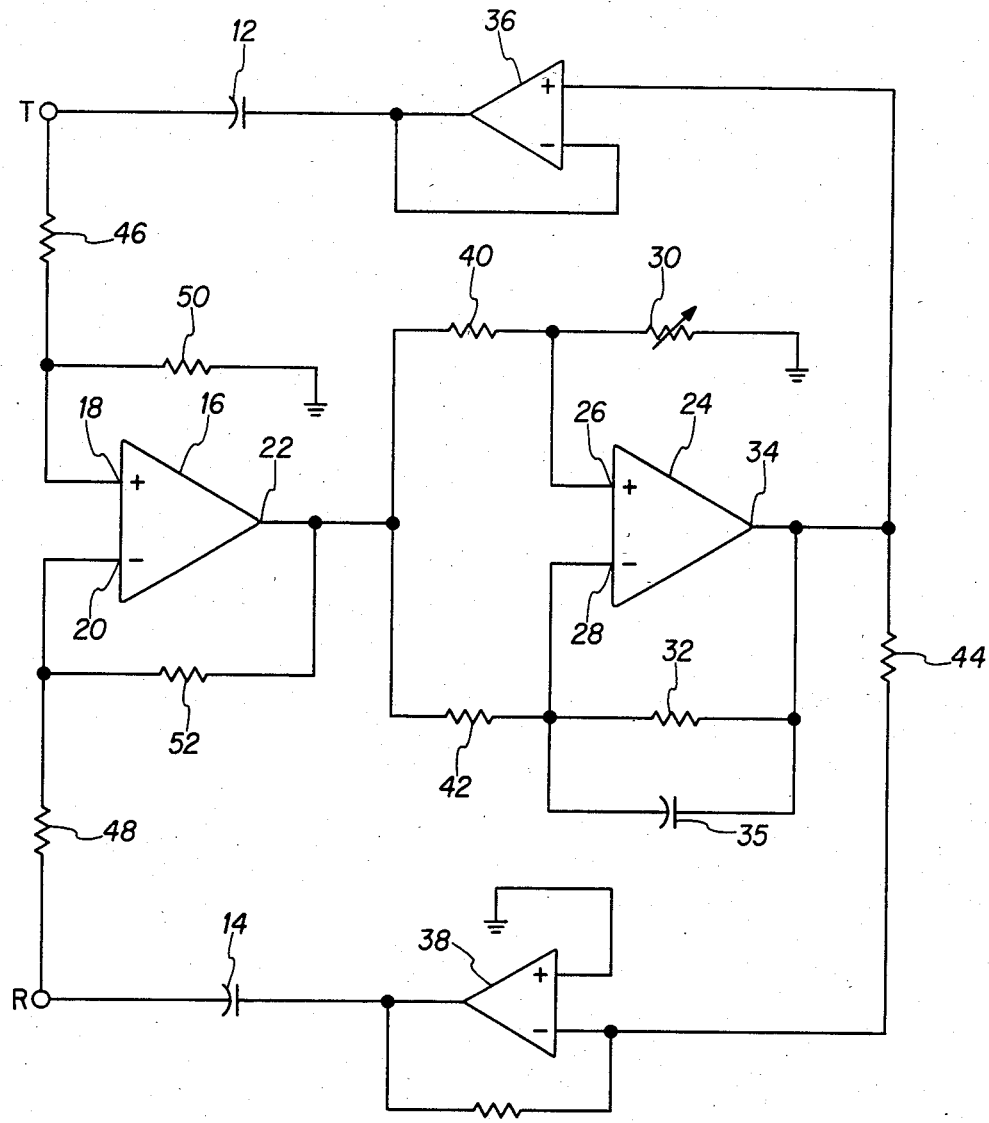
FIG. 2 is a circuit diagram of the FIG. 1 block diagram.

Referring to FIGS. 1 and 2, a preferred embodiment of this present invention is a build-out capacitor circuit for use with a voice frequency loaded pair cable having a tip terminal T and a ring terminal R. A first means 16 for comparing, such as a differential amplifier, is provided and has a noninverting input 18 operatively connected to the tip terminal T and an inverting input 20 operatively connected to the ring terminal R. The first means 16 has an output 22 and a differential gain of one.

A second means 24 for comparing, such as a transfer function means, is provided and has a noninverting input 26 operatively connected to the output 22 of the first means 16 for comparing by a first resistor 40 and an inverting input 28 operatively connected also to the output 22 of the first means 16 by a second resistor 42. The second means 24 has an adjustable resistance 30 operatively connected between the noninverting input 26 and ground. The adjustment provides for the value of the gain varying from a positive one value to negative numerical values thereby providing for different capacitor values between zero and a predetermined capacitor value greater than C.

A feedback resistance 32 is operatively connected between the inverting input 28 and an output 34 of the second means 24 for comparing. Capacitor 35 is connected across feedback resistor 32 to prevent oscillations.

An amplifier means 36 is operatively connected in series with the first fixed capacitor 12 between the output 34 of the second means 24 and the tip terminal T. An inverter means 38 is operatively connected in series with the second fixed capacitor 14 between the output 34 of the second means 24 and the ring terminal R.

In the preferred embodiment as shown in FIG. 2 resistor 44 connects the output 34 of the second means 24 to the inverter means 38. Also the first means 16 has its noninverting input 18 connected to the tip terminal T by resistor 46 and has its inverting input 20 connected to the ring terminal R by resistor 48. Resistor 50 is connected from the noninverting input 18 to ground and resistor 52 is connected from the input 20 to the output 22 to create a unity gain differential amplifier.

The invention is not limited to the particular details of the apparatus depicted and other modifications and applications are contemplated. Certain other changes may be made in the above described apparatus without departing from the true spirit and scope of the invention herein involved. It is intended therefore, that the subject matter in the above depiction shall be interpreted as illustrative and not in a limiting sense.

What is claimed is:

1. A build out capacitor circuit for use with tip and ring terminals, said circuit comprising:

means for providing an impedance between the tip terminal and ground and between the ring terminal and ground, said means having a first input connected to the tip terminal and a second input connected to the ring terminal and also having first and second outputs, and said means for providing an impedance having means for amplifying having a gain of K and wherein said impedance is equal to 1/SC (1−K) with an equivalent capacitance equal to C (1−K) wherein C is the value of a first or second fixed capacitor; said first fixed capacitor connected between said first output and the tip terminal and said fixed second capacitor connected between said second output and the ring terminal.

2. The apparatus described in claim 1 wherein said gain of said means for amplifying is adjustable, thereby providing an adjustable virtual impedance.

3. The apparatus described in claim 1 wherein said means for amplifying is adjustable for an inverting gain thereby providing for a capacitor multiplier circuit.

4. A build out capacitor circuit for use with tip and ring terminals, said circuit comprising;

first means for comparing having a noninverting input operatively connected to the tip terminal and an inverting input operatively connected to the ring terminal and having an output;

second means for comparing having a noninverting input operatively connected to said output of said first means for comparing, and an inverting input operatively connected to said output of said first means for comparing, said second means having an adjustable resistor operatively connected between said noninverting input and ground and a feedback resistance operatively connected between said inverting input and an output of said second means for comparing;

amplifier means operatively connected in series with a first fixed capacitor between said output of said second means and the tip terminal; and inverter means operatively connected in series with a second fixed capacitor between said output of said second means and the ring terminal.

5. The apparatus described in claim 4 wherein said second means for comparing has said noninverting input connected to said output of said first means for comparing by a first resistor and said inverting input connected to said output of said first means for comparing by a second resistor.

6. The apparatus described in claim 4 wherein said second fixed capacitance is equal to said first fixed capacitance.

* * * * *